(12) United States Patent
Yost

(10) Patent No.: US 11,255,978 B2
(45) Date of Patent: Feb. 22, 2022

(54) CORRECTIONS RADIO ANTENNA MOUNT ON THE RANDOME OF A GNSS RECEIVER

(71) Applicant: Caterpillar Trimble Control Technologies LLC, Dayton, OH (US)

(72) Inventor: Jerald W. Yost, Troy, OH (US)

(73) Assignee: Caterpillar Trimble Control Technologies LLC, Dayton, OH (US)

( * ) Notice: Subject to any disclaimer, the term of this patent is extended or adjusted under 35 U.S.C. 154(b) by 654 days.

(21) Appl. No.: 16/156,959

(22) Filed: Oct. 10, 2018

(65) Prior Publication Data

US 2020/0116870 A1 Apr. 16, 2020

(51) Int. Cl.
*G01S 19/36* (2010.01)
*G01S 19/25* (2010.01)
*G01S 19/41* (2010.01)

(52) U.S. Cl.
CPC .............. *G01S 19/36* (2013.01); *G01S 19/25* (2013.01); *G01S 19/41* (2013.01)

(58) Field of Classification Search
CPC .......... G01S 19/25; G01S 19/36; G01S 19/41; H01Q 1/12
See application file for complete search history.

(56) References Cited

U.S. PATENT DOCUMENTS 5,523,761 A 6/1996 Gildea
5,691,726 A 11/1997 Nichols et al.

FOREIGN PATENT DOCUMENTS

| EP | 1 077 503 A2 | 2/2001 | |
|---|---|---|---|
| EP | 1077503 A2 * | 2/2001 | ............. H01Q 21/28 |
| EP | 1 202 388 A2 | 5/2002 | |
| EP | 1202388 A2 * | 5/2002 | ............. G01S 19/14 |
| EP | 1 249 892 A2 | 10/2002 | |

OTHER PUBLICATIONS

International Search Report and Written Opinion for Application No. PCT/US2019/054334, dated Jan. 10, 2020, 16 pages.

* cited by examiner

*Primary Examiner* — Dao L Phan
(74) *Attorney, Agent, or Firm* — Kilpatrick Townsend & Stockton

(57) ABSTRACT

Systems and methods for receiving GNSS and corrections signals by a GNSS rover. The GNSS rover may include a radome enclosing a GNSS antenna and a GNSS front end. The GNSS rover may also include a corrections antenna attached to a connection housing and configured to receive corrections signals from a base station. The connection housing may be configured to removably attach to the radome. The GNSS rover may further include a corrections front end enclosed within the radome and electrically coupled to the corrections antenna via capacitive coupling when the connection housing is removably attached to the radome. The GNSS rover may further include a first capacitor plate enclosed within the radome and positioned substantially parallel to an outer wall of the radome and a second capacitor plate enclosed within the connection housing and positioned substantially parallel to an outer wall of the connection housing.

20 Claims, 12 Drawing Sheets

CORRECTIONS RADIO ANTENNA MOUNT ON THE RANDOME OF A GNSS RECEIVER

BACKGROUND

Global navigation satellite systems (GNSS) use wireless signals that are transmitted from medium Earth orbit (MEO) or geostationary Earth orbit (GEO) satellites to GNSS receivers to determine position, velocity, and time information for the GNSS receivers. Examples of currently operational GNSSs include the United States' Global Positioning System (GPS), the Russian Global Navigation Satellite System (GLONASS), the Chinese BeiDou Satellite Navigation System, the European Union's (EU) Galileo, and the Satellite-based Augmentation System (SBAS). Today, GNSS receivers are used in a wide range of applications, including navigation (e.g., for automobiles, planes, boats, persons, animals, freight, military precision-guided munitions, etc.), surveying, mapping, and time referencing. Further applications for GNSS technology will become available as new techniques for improving GNSS accuracy are introduced.

SUMMARY

In a first aspect of the present invention, a global navigation satellite system (GNSS) rover is provided. The GNSS rover may include a radome. The GNSS rover may also include a GNSS antenna configured to receive GNSS signals from one or more GNSS satellites. The GNSS rover may further include a GNSS front end enclosed within the radome and electrically coupled to the GNSS antenna. In some embodiments, the GNSS front end is configured to generate GNSS digital samples based on the received GNSS signals. The GNSS rover may further include a corrections antenna configured to receive corrections signals from a base station. The GNSS rover may further include a connection housing attached to the corrections antenna. In some embodiments, the connection housing is configured to removably attach to the radome. The GNSS rover may further include a corrections front end enclosed within the radome and electrically coupled to the corrections antenna via capacitive coupling when the connection housing is removably attached to the radome. In some embodiments, the corrections front end is configured to generate corrections digital samples based on the received corrections signals.

The GNSS rover may further include a first capacitor plate enclosed within the radome and positioned substantially parallel to an outer wall of the radome. In some embodiments, the first capacitor plate is electrically coupled to the corrections front end. The GNSS rover may further include a second capacitor plate enclosed within the connection housing and positioned substantially parallel to an outer wall of the connection housing. In some embodiments, the second capacitor plate is electrically coupled to the corrections antenna. In some embodiments, the first capacitor plate and the second capacitor plate form the capacitive coupling when the connection housing is removably attached to the radome. The GNSS rover may further include one or more receiver processors enclosed within the radome and configured to perform operations including receiving the GNSS digital samples from the GNSS front end, receiving the corrections digital samples from the corrections front end, and generating GNSS position data based on the GNSS digital samples and the corrections digital samples.

In some embodiments, the GNSS antenna is enclosed within the radome. In some embodiments, the GNSS position data includes one or more position estimates of the GNSS rover. In some embodiments, generating the GNSS position data based on the GNSS digital samples and the corrections digital samples includes generating a first position estimate using the GNSS digital samples and correcting the first position estimate using the corrections digital samples to generate a second position estimate. In some embodiments, one or more first magnets are integrated into the radome and one or more second magnets are integrated into the connection housing such that the one or more first magnets produce an attractive force with the one or more second magnets when the connection housing is removably attached to the radome. In some embodiments, the one or more first magnets is a ring-shaped first magnet encircling the first capacitor plate and the one or more second magnets is a ring-shaped second magnet encircling the second capacitor plate. In some embodiments, each of the GNSS front end and the corrections front end comprises a band-pass filter, a low-noise amplifier electrically coupled to the band-pass filter, a mixer electrically coupled to the low-noise amplifier, a local oscillator electrically coupled to the mixer, and an analog-to-digital converter electrically coupled to the mixer.

In a second aspect of the present invention, a method is provided. The method may include receiving, by a global navigation satellite system (GNSS) antenna, GNSS signals from one or more GNSS satellites. The method may also include generating, by a GNSS front end enclosed within a radome and electrically coupled to the GNSS antenna, GNSS digital samples based on the received GNSS signals. The method may further include receiving, by a corrections antenna, corrections signals from a base station. In some embodiments, a connection housing is attached to the corrections antenna. In some embodiments, the connection housing is configured to removably attach to the radome. The method may further include generating, by a corrections front end enclosed within the radome and electrically coupled to the corrections antenna via capacitive coupling when the connection housing is removably attached to the radome, corrections digital samples based on the received corrections signals. In some embodiments, a first capacitor plate is enclosed within the radome and is positioned substantially parallel to an outer wall of the radome.

In some embodiments, the first capacitor plate is electrically coupled to the corrections front end. In some embodiments, a second capacitor plate is enclosed within the connection housing and is positioned substantially parallel to an outer wall of the connection housing. In some embodiments, the second capacitor plate is electrically coupled to the corrections antenna. In some embodiments, the first capacitor plate and the second capacitor plate form the capacitive coupling when the connection housing is removably attached to the radome. The method may further include receiving, by one or more receiver processors enclosed within the radome, the GNSS digital samples from the GNSS front end. The method may further include receiving, by the one or more receiver processors, the corrections digital samples from the corrections front end. The method may further include generating, by the one or more receiver processors, GNSS position data based on the GNSS digital samples and the corrections digital samples.

In some embodiments, the GNSS antenna is enclosed within the radome. In some embodiments, the GNSS position data includes one or more position estimates of the GNSS rover. In some embodiments, generating the GNSS position data based on the GNSS digital samples and the corrections digital samples includes generating a first position estimate using the GNSS digital samples and correcting the first position estimate using the corrections digital samples to generate a second position estimate. In some embodiments, one or more first magnets are integrated into the radome and one or more second magnets are integrated into the connection housing such that the one or more first magnets produce an attractive force with the one or more second magnets when the connection housing is removably attached to the radome. In some embodiments, the one or more first magnets is a ring-shaped first magnet encircling the first capacitor plate and the one or more second magnets is a ring-shaped second magnet encircling the second capacitor plate. In some embodiments, each of the GNSS front end and the corrections front end comprises a band-pass filter, a low-noise amplifier electrically coupled to the band-pass filter, a mixer electrically coupled to the low-noise amplifier, a local oscillator electrically coupled to the mixer, and an analog-to-digital converter electrically coupled to the mixer.

In a third aspect of the present invention, a non-transitory computer-readable medium is provided. In some embodiments, the non-transitory computer-readable medium comprises instructions that, when executed by one or more processors, cause the one or more processors to perform operations. The operations may include one or more steps of the method of the second aspect of the present invention.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

Figure 1:
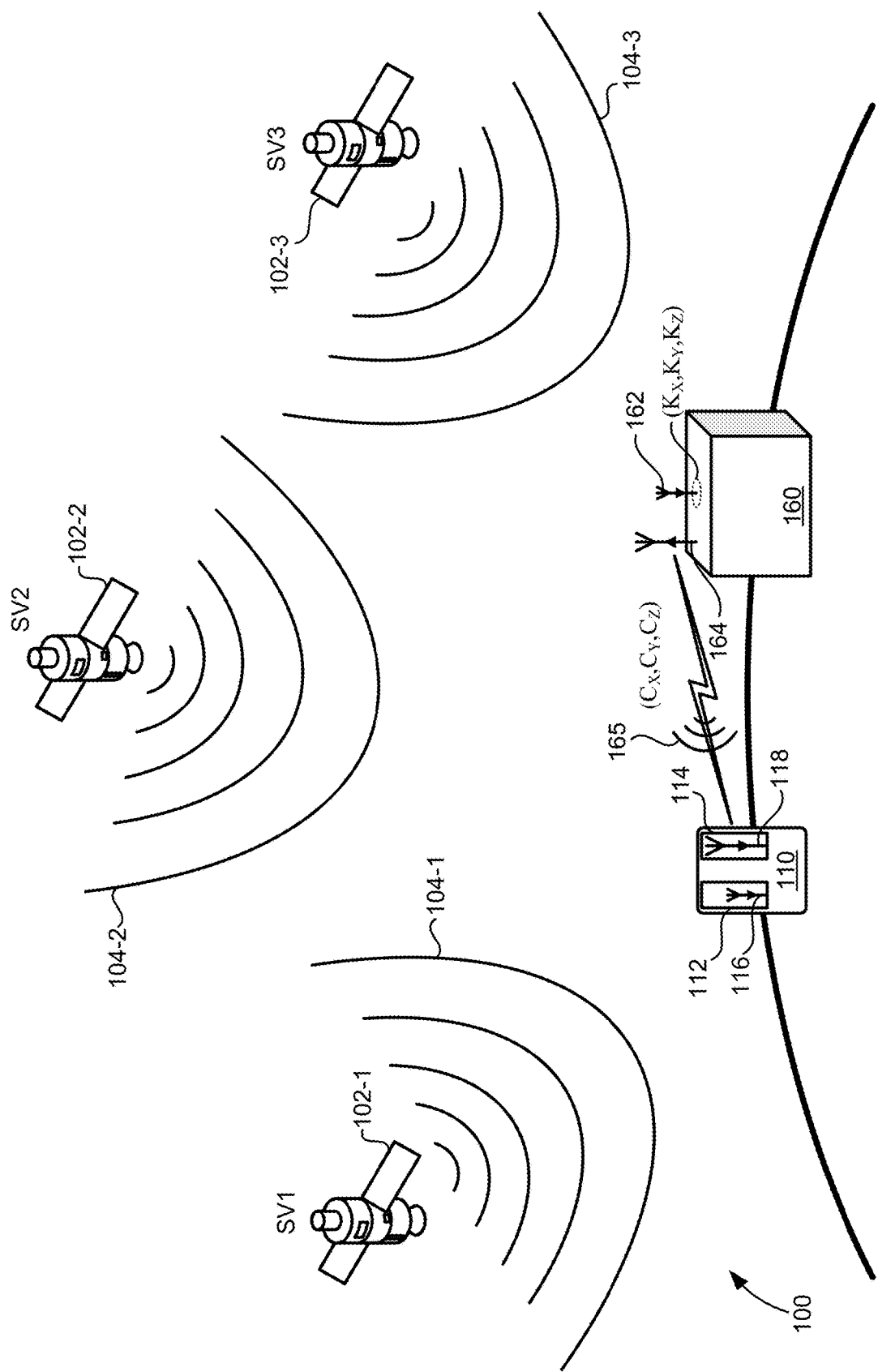
FIG. 1 illustrates an example of a global navigation satellite system (GNSS) rover and a base station operating within a GNSS, according to some embodiments of the present invention.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

The accuracy of global navigation satellite system (GNSS) positioning has been improved with the introduction of various correction techniques. One such technique includes transmitting real-time correction data from a base station to a nearby rover. The base station has a GNSS antenna with a fixed, known position that may be similar (e.g., in structure) to a GNSS antenna of the rover. Position estimates made using the base station GNSS antenna are compared to the known position to determine the amount of correction needed. The correction data is transmitted from the base station to the rover over a set of wireless frequencies outside of the GNSS frequencies, such as the 450 or 900 MHz band. The rover then applies the same correction data to the position estimates made using the rover GNSS antenna. In some instances, real-time kinematic (RTK) techniques can be used in which locations relative to the base station are determined by measuring the phase of the carrier wave rather than a pseudorandom noise (PRN) code. Because the carrier signal has a much shorter wavelength than the PRN code cycle width, the ability to accurately measure distance can be significantly improved.

The underlying assumption of such a technique is that positioning errors at the base station are similar to those at the rover, which is generally true when the rover experiences similar atmospheric conditions and/or is at a similar elevation, latitude, or longitude as the base station. One downside of using correction data from a base station is that the rover need include two separate antennas, a first antenna for receiving GNSS signals (i.e., a GNSS antenna), typically in the GHz frequency range, and a second antenna for receiving corrections signals (i.e., a corrections antenna), typically in the MHz range. While the GNSS antenna can be small enough to fit inside the rover, even a ¼ wavelength monopole antenna operating at 450 MHz is approximately 16 cm in length, likely exceeding the dimensions of the radome of the rover and thereby necessitating that the corrections antenna be externally attached.

Several difficulties arise with externally attaching the corrections antenna to the radome. For example, the corrections antenna can be easily broken off during use due to the typical conditions in which the rover is used. Each time the corrections antenna is broken off, the radio-frequency (RF) connection (e.g., coaxial cable) must be repaired which may require opening the radome. Other more expensive components within the rover may also be damaged. For example, a side impact to the corrections antenna may cause cracking to the radome which may cause water to seep into the filters, amplifiers, oscillators, etc., of the RF front end(s) within the radome. Another difficulty arises with interference by the corrections antenna to the GNSS signals, which can cause blocking or multipath effects. Embodiments of the present invention relate to systems, methods, and other techniques for addressing these and other issues associated with externally attaching a corrections antenna to a radome of a GNSS rover. Some embodiments include a GNSS rover having a detachable corrections antenna that utilizes capacitive coupling to achieve electrical connectivity between the corrections antenna and the antenna receiving circuit enclosed within the radome. The capacitive coupling may be formed by a first capacitor plate enclosed within the radome and positioned substantially parallel to an outer wall of the radome and a second capacitor plate enclosed within a connection housing coupled to the corrections antenna.

FIG. 1 illustrates an example of a GNSS rover 110 and a base station 160 operating within a GNSS 100, according to some embodiments of the present invention. GNSS 100 includes one or more GNSS satellites 102, i.e., space vehicles (SV), in orbit above GNSS rover 110 and base station 160. GNSS satellites 102 may continuously, periodically, or intermittently broadcast wireless signals 104 containing PRN codes modulated onto carrier frequencies (e.g., L1 and/or L2 carrier frequencies). Wireless signals 104 corresponding to different GNSS satellites 102 may include different PRN codes that identify a particular GNSS satellite 102 such that receivers may associate different distance estimates (i.e., pseudoranges) to different GNSS satellites 102. For example, GNSS satellite 102-1 may broadcast wireless signals 104-1 which contain a different PRN code than the PRN code contained in wireless signals 104-2 broadcasted by GNSS satellite 102-2. Similarly, GNSS satellite 102-3 may broadcast wireless signals 104-3 which contain a different PRN code than the PRN codes contained in wireless signals 104-1 and 104-2 broadcasted by GNSS satellites 102-1 and 102-2, respectively. One or more of wireless signals 104 may be received by a GNSS antenna 116 of GNSS rover 110. In some instances, GNSS antenna 116 is configured as a part of a GNSS receiver 112 or, in some instances, the entirety of GNSS rover 110 may be referred to as the GNSS receiver. GNSS antenna 116 may be a patch antenna, a turnstile antenna, a helical antenna, a parabolic antenna, a phased-array antenna, a resistive plane antenna, a choke ring antenna, a radome antenna, among other possibilities.

Each of GNSS satellites 102 may belong to one or more of a variety of system types, such as Global Positioning System (GPS), Satellite-based Augmentation System (SBAS), Galileo, Global Navigation Satellite System (GLONASS), and BeiDou, and may transmit wireless signals having one or more of a variety of signal types (e.g., GPS L1 C/A, GPS L2C, Galileo E1, Galileo E5A, etc.). For example, GNSS satellite 102-1 may be a GPS satellite and may transmit wireless signals having a GPS L1 C/A signal type (i.e., wireless signals having frequencies within the GPS L1 band and having been modulated using C/A code). GNSS satellite 102-1 may additionally or alternatively transmit wireless signals having a GPS L2C signal type (i.e., wireless signals having frequencies within the GPS L2 band and having been modulated using L2 civil codes). In some embodiments, GNSS satellite 102-1 may additionally be a Galileo satellite and may transmit wireless signals having a Galileo signal type (e.g., Galileo E1). Accordingly, a single satellite may include the ability to transmit wireless signals of a variety of signal types.

Merely by way of example, GNSS rover 110 may use the three distance estimates between itself and GNSS satellites 102-1, 102-2, and 102-3 to generate a position estimate through a process called trilateration. In some instances, trilateration involves generating three spheres having center locations corresponding to the locations of GNSS satellites 102 and radii corresponding to the distance estimates (i.e., pseudoranges). The three spheres intersect at two locations, one of which is more plausible than the other given the position of the earth. The less plausible location is discarded and the more plausible location is used as the position estimate for GNSS rover 110. The position estimate may be continuously, periodically, or intermittently updated by generating new distance estimates and performing trilateration using the new distance estimates. Subsequent position estimates may benefit from previous position estimates through filtering processes (e.g., Kalman filtering) capable of improving position estimate accuracy. Position estimates may also be determined using other techniques. In practice, a fourth satellite may be observed to estimate the receiver clock error with respect to the satellite system time.

In some embodiments, base station 160 may include a GNSS antenna 162 positioned at a known position (e.g., $K_X$, $K_Y$, $K_Z$). GNSS antenna 162 may be similar to GNSS antenna 116 and may be configured to receive one or more of wireless signals 104. For example, GNSS antenna 162 may be a patch antenna, a turnstile antenna, a helical antenna, a parabolic antenna, a phased-array antenna, a resistive plane antenna, a choke ring antenna, a radome antenna, etc., and may have a similar orientation and/or surroundings to that of GNSS antenna 116. Position estimates made using GNSS antenna 162 are compared to the known position and correction data (e.g., $C_X$, $C_Y$, $C_Z$) may be generated based on the comparison. The correction data may include a 3D offset amount and/or any one of various types of raw or processed satellite data that may be used to improve the accuracy of a position estimate. A corrections signal 165 containing the correction data may then be transmitted from base station 160 to GNSS rover 110 using a corrections antenna 164 at base station 160 and a corrections antenna 118 at GNSS rover 110. In some embodiments, corrections signal 165 is transmitted over a set of wireless frequencies outside the GNSS frequencies (e.g., lower than the GNSS frequencies). In some embodiments, corrections antenna 164 may be used for transmission only and corrections antenna 118 may be used for reception only, although in some embodiments additional handshaking between GNSS rover 110 and base station 160 may occur.

Figure 2:
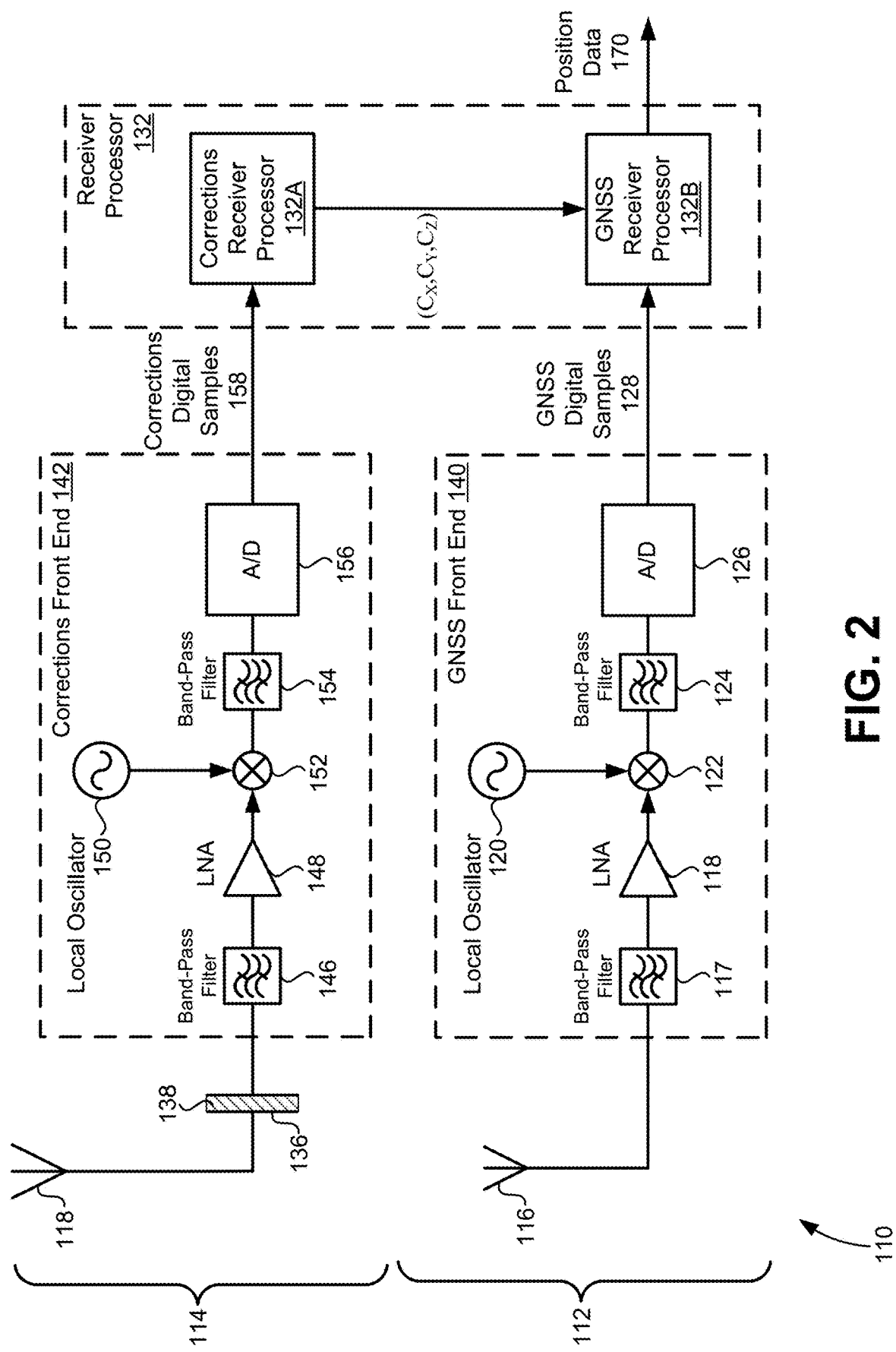
FIG. 2 illustrates a block diagram of a GNSS rover having a GNSS receiver and a corrections receiver, according to some embodiments of the present invention.

FIG. 2 illustrates a block diagram of GNSS rover 110 having a GNSS receiver 112 and a corrections receiver 114, according to some embodiments of the present invention. In some embodiments, GNSS rover 110 includes GNSS antenna 116 for receiving wireless signals 104 and sending/routing a signal related to wireless signals 104 to a GNSS front end 140. GNSS antenna 116 may be linearly or circularly polarized, may be mounted or embedded, may be a single antenna or an array antenna, may have a narrow or wide bandwidth, among other possibilities. GNSS front end 140 may include a band-pass filter 117 for initially filtering out undesirable frequency components outside the frequencies of interest, a low-noise amplifier (LNA) 118 for amplifying the received signal, a local oscillator 120 and a mixer 122 for down converting the received signal from RF to intermediate frequencies (IF), a band-pass filter 124 for removing frequency components outside IF, and an analog-to-digital (A/D) converter 126 for sampling the received signal to generate GNSS digital samples 128.

In some instances, GNSS front end 140 includes additional or fewer components than that shown in FIG. 2. For example, GNSS front end 140 may include a second local oscillator (90 degrees out of phase with respect to local oscillator 120), a second mixer, a second band-pass filter, and a second A/D converter for generating digital samples corresponding to the quadrature component of wireless signals 104. Digital samples corresponding to the in-phase component of wireless signals 104 and digital samples corresponding to the quadrature component of wireless signals 104 may both be sent to receiver processor 132. In some embodiments, digital samples corresponding to both in-phase and quadrature components may be included in digital samples 128. In some embodiments, receiver processor 132 may include one or more correlators.

Other components within GNSS front end 140 may include a phase-locked loop (PLL) for synchronizing the phase of local oscillator 120 with the phase of the received signal, and a phase shifter for generating a second mixing signal using local oscillator 120 that is 90 degrees out of phase with local oscillator 120. In some embodiments, GNSS front end 140 does not include band-pass filter 117 and LNA 118. In some embodiments, A/D converter 126 is coupled directly to GNSS antenna 116 and samples the RF signal directly without down-conversion to IF. In some embodiments, GNSS front end 140 only includes band-pass filter 117 and A/D converter 126. Other possible configurations of GNSS front end 140 are contemplated.

Receiver processor 132 may perform one or more correlations on GNSS digital samples 128 using local codes to generate distance estimates between GNSS rover 110 and GNSS satellites 102. In some embodiments, one or more components of receiver processor 132 (such as, for example, one or more correlators) include specific pieces of hardware, such as an application-specific integrated circuit (ASIC) or a field-programmable gate array (FPGA). In some embodiments, operations performed by receiver processor 132 are performed entirely in software using digital signal processing (DSP) techniques. After generating the distance estimates, receiver processor 132 may perform trilateration to generate a position estimate for GNSS rover 110. After generating at least one position estimate, receiver processor 132 may output position data 170 comprising a single or a plurality of GNSS points (i.e., position estimates). Each of the plurality of GNSS points may be a 3D coordinate represented by three real numbers. In some embodiments, the three numbers may correspond to latitude, longitude, and elevation/altitude. In other embodiments, the three numbers may correspond to X, Y, and Z positions. Position data 170 may be outputted to be displayed to a user, transmitted to a separate device (e.g., computer, smartphone, server, etc.) via a wired or wireless connection, or further processed, among other possibilities.

In some embodiments, GNSS rover 110 includes a corrections antenna 118 for receiving corrections signal 165 (transmitted by corrections antenna 164) and sending/routing a signal related to corrections signal 165 to a corrections front end 142. In some embodiments, corrections antenna 118 may be electrically coupled to corrections front end 142 via a parallel-plate capacitor 136 filled with a dielectric 138. Corrections front end 142 may include a band-pass filter 146 for initially filtering out undesirable frequency components outside the frequencies of interest, an LNA 148 for amplifying the received signal, a local oscillator 150 and a mixer 152 for down converting the received signal from RF to IF, a band-pass filter 154 for removing frequency components outside IF, and an A/D converter 156 for sampling the received signal to generate corrections digital samples 158. In some instances, corrections front end 142 includes additional or fewer components than that shown in FIG. 2. Corrections digital samples 158 may be sent to receiver processor 132 and may be used for computing position data 170. Receiver processor 132 may optionally include a corrections receiver processor 132A for receiving and processing corrections digital samples 158 and a GNSS receiver processor 132B for receiving and processing GNSS digital samples 128 and the correction data contained in corrections signal 165.

Figure 3A:
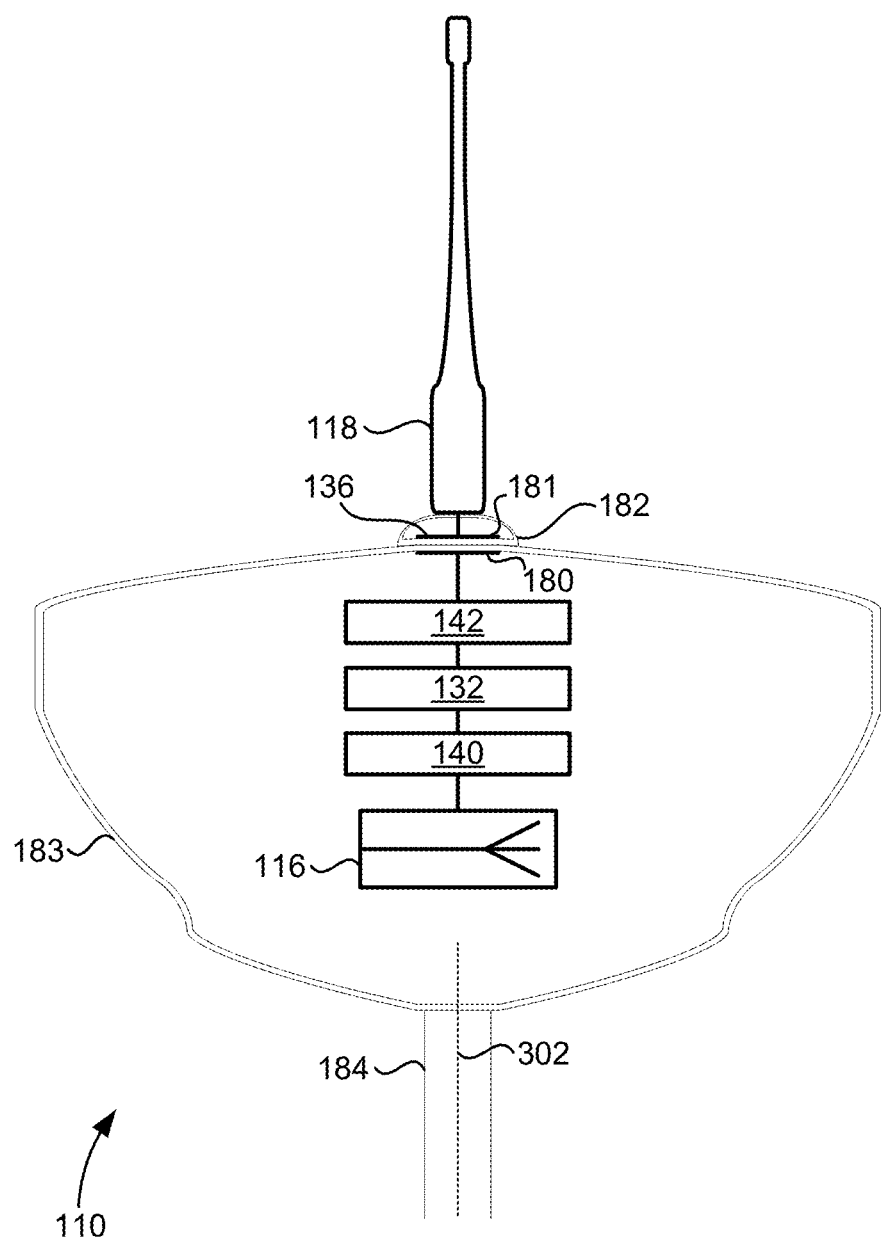
FIGS. 3A and 3B illustrate side schematic views of a GNSS rover, according to some embodiments of the present invention.
Figure 3B:
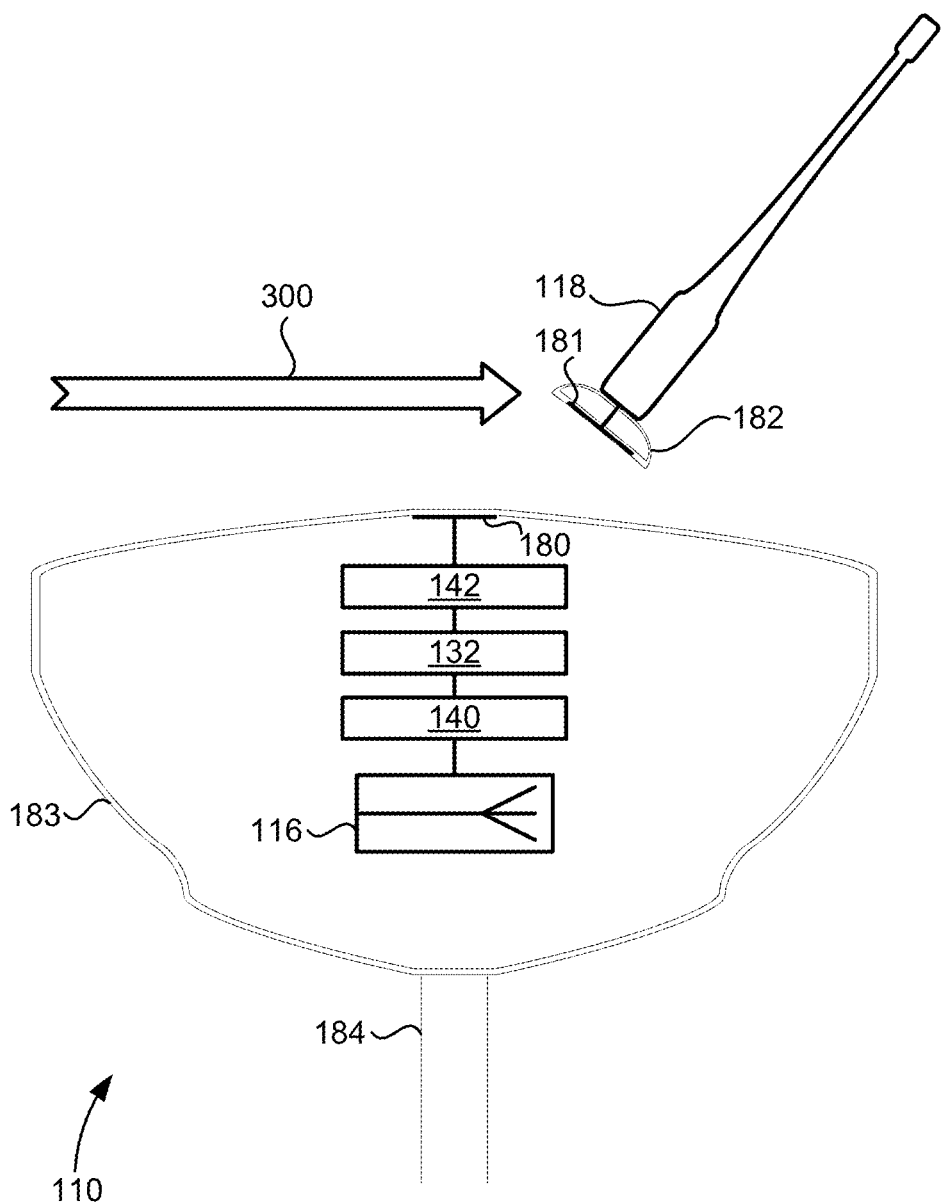

FIGS. 3A and 3B illustrate side schematic views of GNSS rover 110 with corrections antenna 118 removably attached (FIG. 3A) and detached (FIG. 3B), according to some embodiments of the present invention. Corrections antenna 118 may become detached from radome 183 due to a side impact force 300, among other possibilities. In some instances, any damage to corrections antenna 118 or radome 183 during detachment may be minimal such that corrections antenna 118 may be easily reattached to radome 183 without any loss of functionality to GNSS rover 110. It may also be desirable in some instances for a user to purposely detach corrections antenna 118 when GNSS rover 110 is not being used or while being stored.

In some embodiments, GNSS rover 110 includes a radome 183 attached to one end of a rod 184. Radome 183 may include a plurality of walls enclosing one or more electronic components, such as corrections front end 142, receiver processor 132, GNSS front end 140, and/or GNSS antenna 116. Radome 183 may be composed of a material suitable for allowing passage of wireless electromagnetic signals while protecting the electronic components against rain, wind, etc. In some embodiments, a first capacitor plate 180 may be enclosed within radome 183 and positioned parallel (or substantially parallel) to an outer wall 177 of radome 183. First capacitor plate 180 may be electrically coupled to corrections front end 142 via a coaxial cable or other conductor. In one example, each of first capacitor plate 180, corrections front end 142, receiver processor 132, GNSS front end 140, and GNSS antenna 116 are centered along a center column 302 of GNSS rover 110 and vertically offset from each other such that the electronic components are circularly symmetric with respect to GNSS rover 110. Such embodiments reduce the interference to GNSS signals received by GNSS antenna 116, which may be oriented parallel or perpendicular to center column 302.

Corrections antenna 118 may be attached (e.g., mounted) to a connection housing 182 which may be removably attached to radome 183. Connection housing 182 may include a plurality of walls and/or surfaces, including a bottom surface/wall configured to interface with a top surface/wall of radome 183. In some embodiments, a second capacitor plate 181 may be enclosed within connection housing 182 and may be positioned parallel (or substantially parallel) to an outer wall 179 of connection housing 182. First capacitor plate 180 and second capacitor plate 181 may be positioned such that they form capacitor 136 (i.e., capacitive coupling) when connection housing 182 is removably attached to radome 183. Capacitor plates 180 and 181 may be similar or different in size and shape and may be separated by a dielectric material with a dielectric constant based on the dielectric constants of outer walls 177 and 179. Accordingly, the properties of formed capacitor 136 may be set by adjusting the sizes or shapes of capacitor plates 180 and 181 and the dielectric constants of outer walls 177 and 179 to desired values. Although corrections antenna 118 and connection housing 182 are illustrated in FIGS. 3A and 3B as being removably attached to a center top location of radome 183, in other embodiments different attachment locations may be utilized. For example, corrections antenna 118 and connection housing 182 may be configured to attach to a non-center top location of radome 183, a side location of radome 183, a bottom location of radome 183, among other possibilities.

Figure 4A:
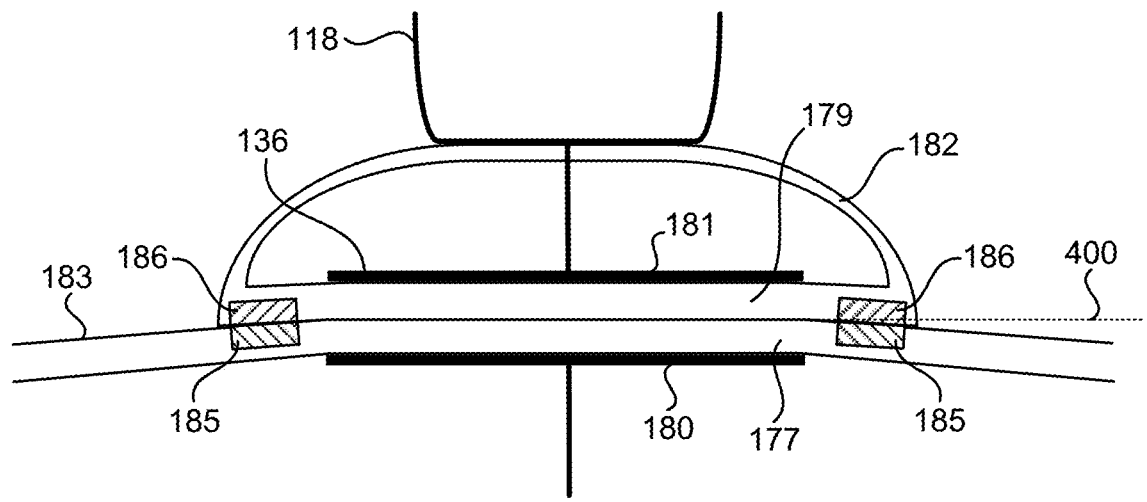
FIGS. 4A and 4B illustrate side schematic views of a GNSS, according to some embodiments of the present invention.
Figure 4B:
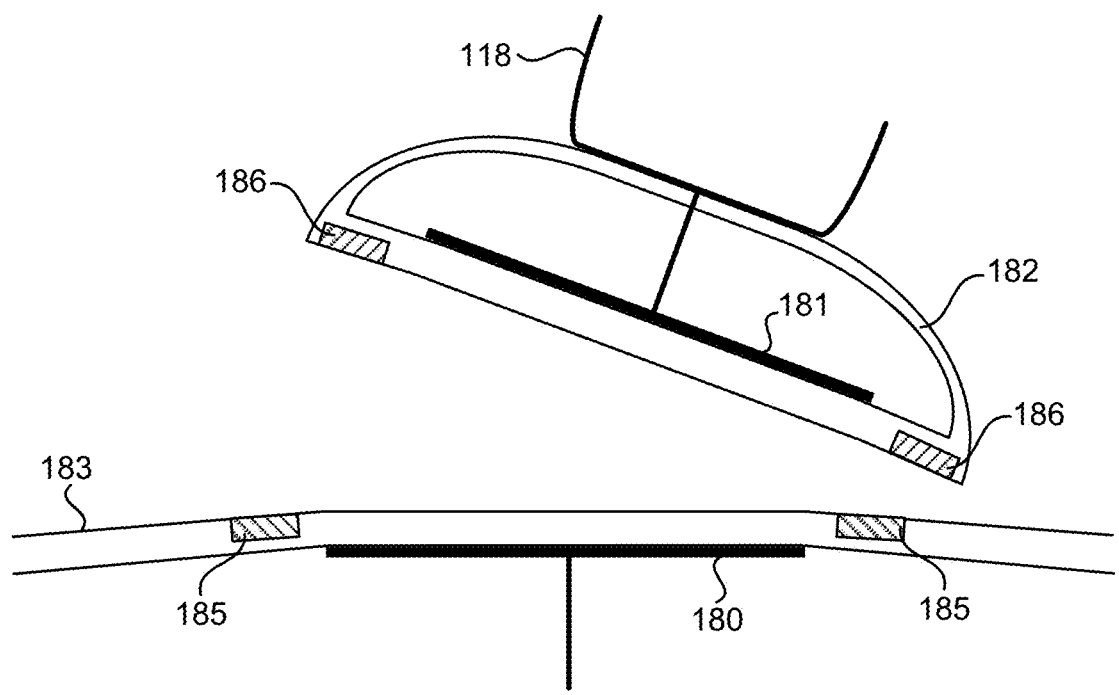

FIGS. 4A and 4B illustrate side schematic views of GNSS rover 110 with corrections antenna 118 removably attached (FIG. 4A) and detached (FIG. 4B), according to some embodiments of the present invention. In some embodiments, one or more magnets may be used to maintain a physical linkage between connection housing 182 and radome 183. For example, one or more first magnets 185 may be integrated into outer wall 177 of radome 183 and one or more second magnets 186 may be integrated into outer wall 179 of connection housing 182 so as to produce an attractive force when connection housing 182 is removably attached to radome 183. Magnets 185 and 186 may be partially or completely enclosed by radome 183 and connection housing 182, respectively. For example, one or more surfaces of first magnets 185 may be partially exposed (i.e., visible and/or accessible) to outside radome 183 and one or more surfaces of second magnets 186 may be partially exposed to outside connection housing 182.

The strength of the physical linkage between connection housing 182 and radome 183 can be improved, in some embodiments, by positioning magnets 185 and 186 such that, when connection housing 182 is removably attached to radome 183, an angle is formed by a first interface line between magnets 185 and 186 and a second interface line 400 between capacitor plates 180 and 181. The first interface line may correspond to the line between and parallel to each of magnets 185 and 186 (at a given cross-section), and second interface line 400 may correspond to the line between and parallel to each of capacitor plates 180 and 181 (at a given cross-section). The angle may be less than 45 degrees and may vary or be constant across cross-sections of GNSS rover 110.

Figure 5:
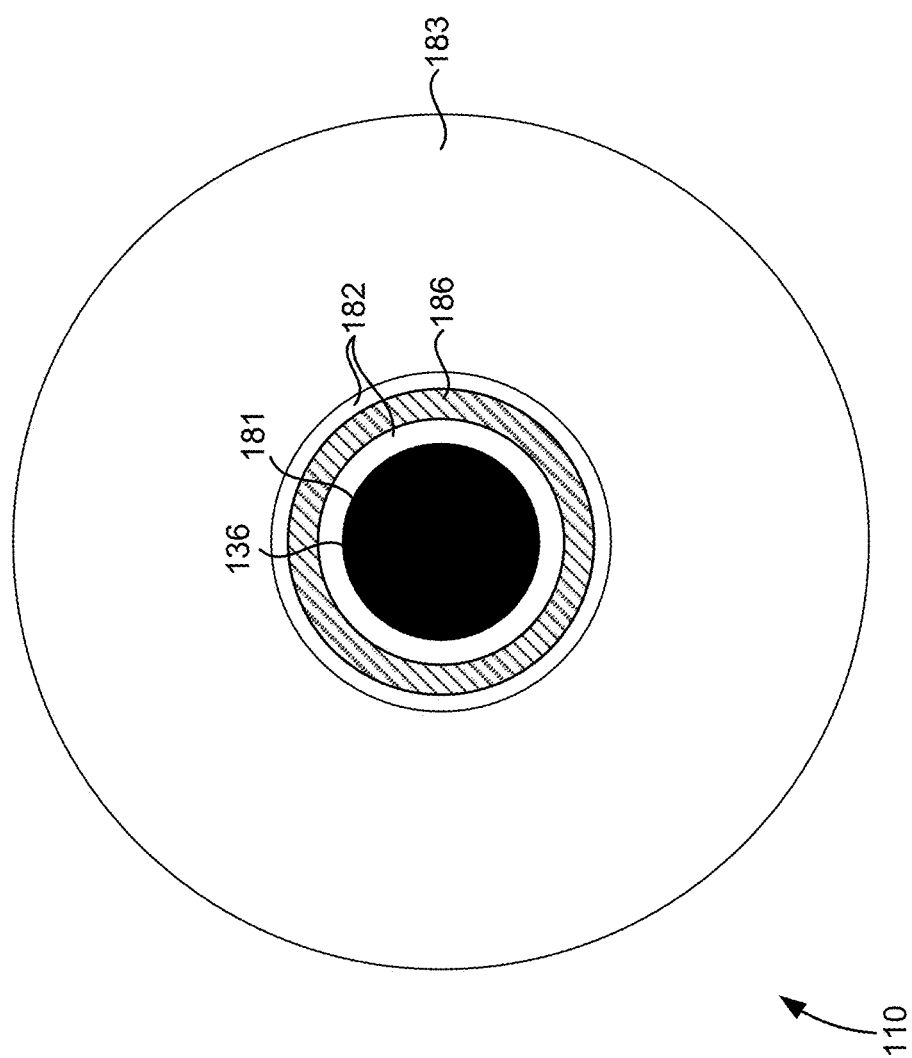
FIG. 5 illustrates a top schematic view of a GNSS rover, according to some embodiments of the present invention.

FIG. 5 illustrates a top schematic view of GNSS rover 110 with one or more components of GNSS rover 110 omitted to show the relationship between one or more other components of GNSS rover 110, according to some embodiments of the present invention. In some embodiments, second capacitor plate 181 is circular and is encircled by second magnet 186 which may be ring-shaped and separated from second capacitor plate 181 by an offset distance. Second magnet 186 may have a single continuous structure and have circular symmetry with respect to center column 302. First capacitor plate 180 (not shown) may have a similar size and shape as second capacitor plate 181 and first magnet 185 (not shown) may have a similar size and shape as second magnet 186.

Figure 6:
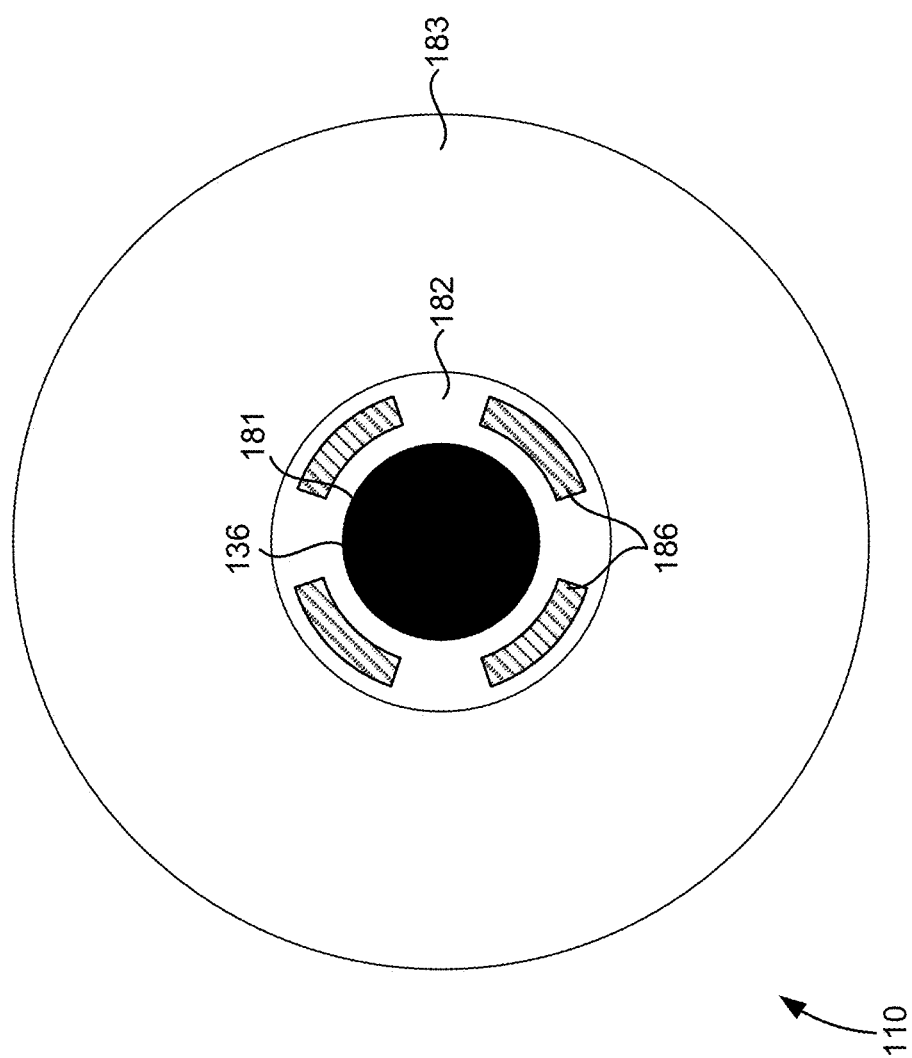
FIG. 6 illustrates a top schematic view of a GNSS rover, according to some embodiments of the present invention.

FIG. 6 illustrates a top schematic view of GNSS rover 110 with one or more components of GNSS rover 110 omitted to show the relationship between one or more other components of GNSS rover 110, according to some embodiments of the present invention. In some embodiments, second capacitor plate 181 is circular and is encircled by second magnets 186 which may be partially ring-shaped and separated from second capacitor plate 181 by an offset distance. Second magnets 186 may comprise multiple magnets and may have partial circular symmetry with respect to center column 302. First capacitor plate 180 (not shown) may have a similar size and shape as second capacitor plate 181 and first magnet 185 (not shown) may have a similar size and shape as second magnet 186.

Figure 7:
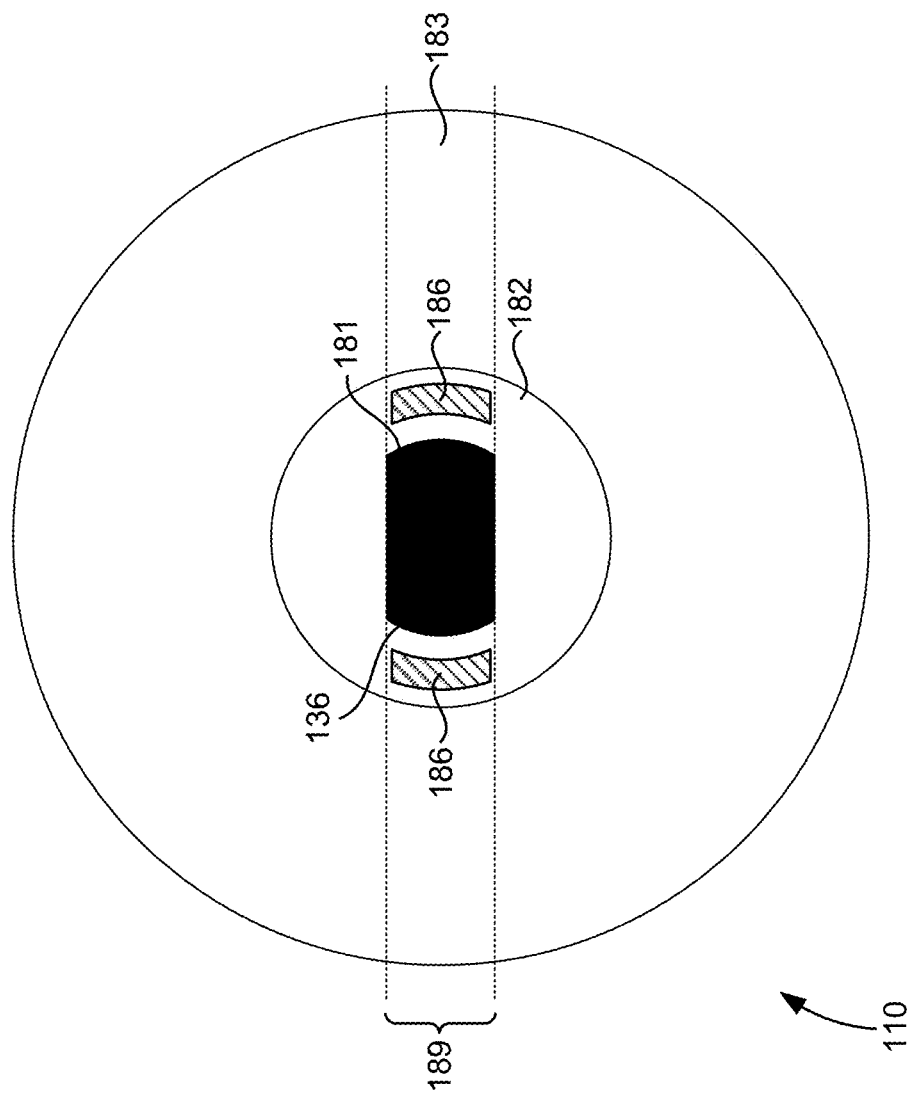
FIG. 7 illustrates a top schematic view of a GNSS rover, according to some embodiments of the present invention.

FIG. 7 illustrates a top schematic view of GNSS rover 110 with one or more components of GNSS rover 110 omitted to show the relationship between one or more other components of GNSS rover 110, according to some embodiments of the present invention. In some embodiments, second capacitor plate 181 and second magnets 186 are confined to a vertical strip 189 having a width less than half of the diameter of connection housing 182. In such embodiments, second capacitor plate 181 may be partially elongated and second magnets 186 may be positioned on each side of second capacitor plate 181. First capacitor plate 180 (not shown) may have a similar size and shape as second capacitor plate 181 and first magnet 185 (not shown) may have a similar size and shape as second magnet 186. First capacitor plate 180 and first magnet 185 may also be confined to vertical strip 189.

Figure 8:
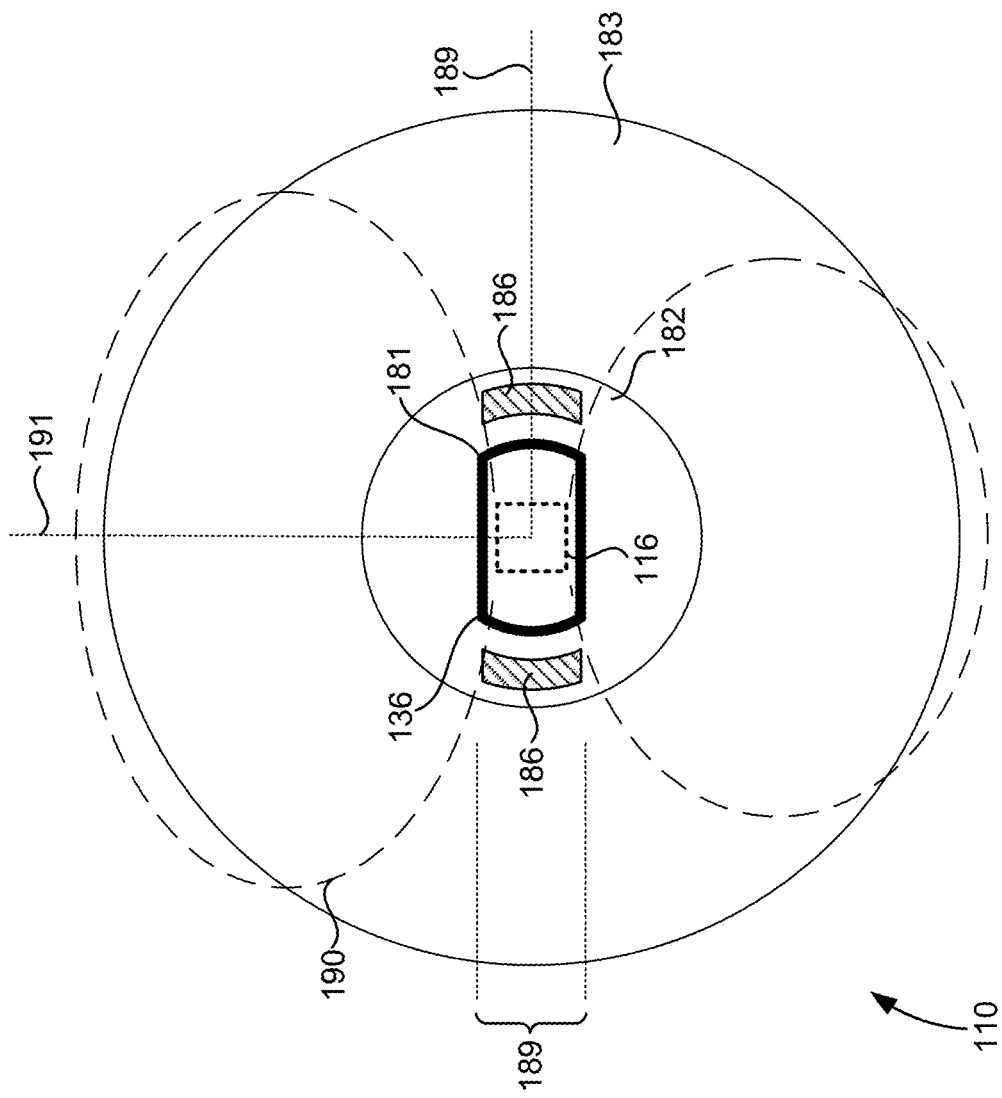
FIG. 8 illustrates a top schematic view of a GNSS rover, according to some embodiments of the present invention.

FIG. 8 illustrates a top schematic view of GNSS rover 110 showing an orientation and corresponding beam patterns of GNSS antenna 116, according to some embodiments of the present invention. GNSS rover 110 illustrated in FIG. 8 may correspond to GNSS rover 110 illustrated in FIG. 7. In some embodiments, improved performance of GNSS rover 110 can be achieved by orienting GNSS antenna 116 such that a direction 191 of a main lobe 190 of the antenna's radiation pattern is perpendicular to vertical strip 189 to which capacitor plates 180 and 181 and magnets 185 and 186 are confined. Main lobe 190 may correspond to the maximum of radiation of the radiation pattern of GNSS antenna 116, and direction 191 may correspond to the vector extending between GNSS antenna 116 and the maximum of radiation of main lobe 190. Such embodiments reduce the interference to GNSS signals received by GNSS antenna 116 due to capacitor plates 180 and 181 and/or magnets 185 and 186 while maintaining the strength of the physical linkage between connection housing 182 and radome 183 and the capacitive coupling formed by capacitor plates 180 and 181.

Figure 9A:
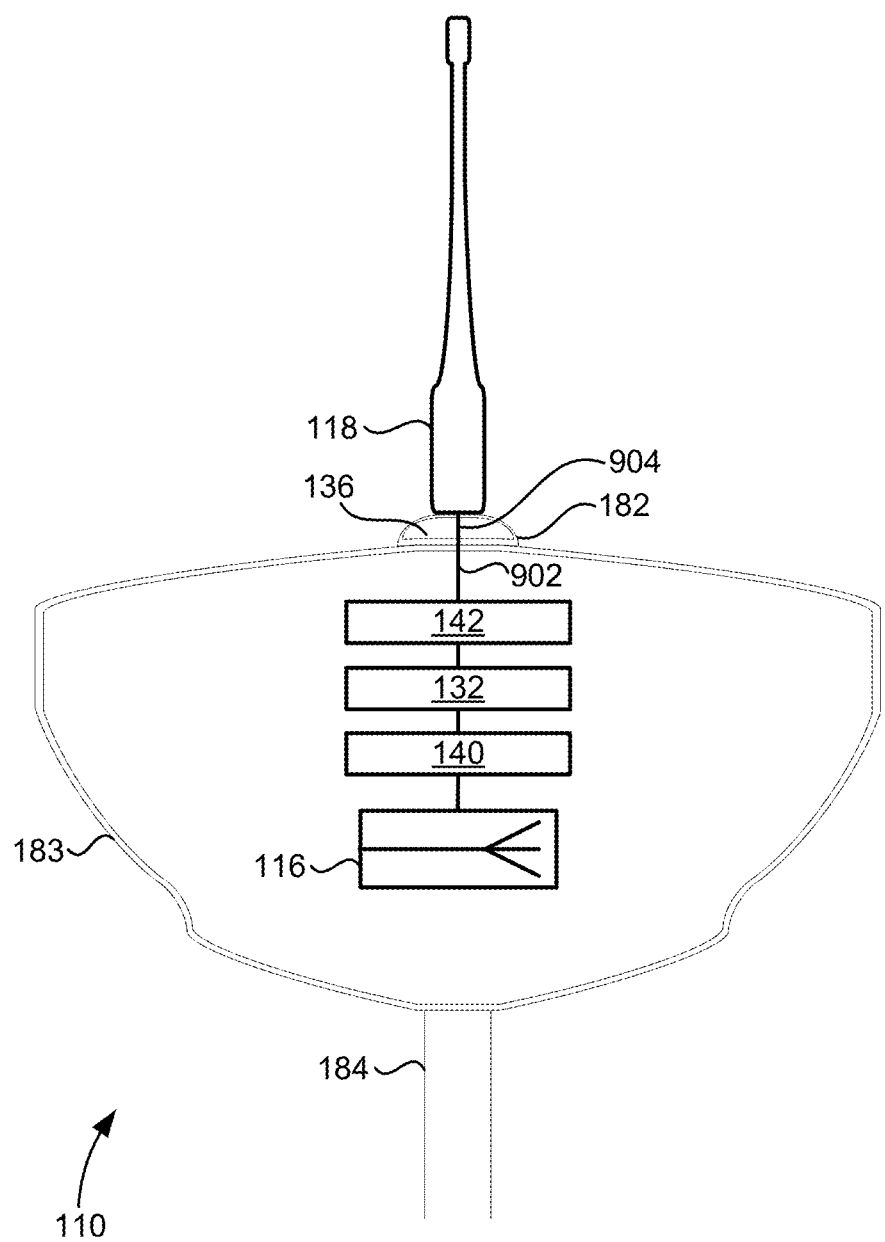
FIGS. 9A and 9B illustrate side schematic views of a GNSS rover, according to some embodiments of the present invention.
Figure 9B:
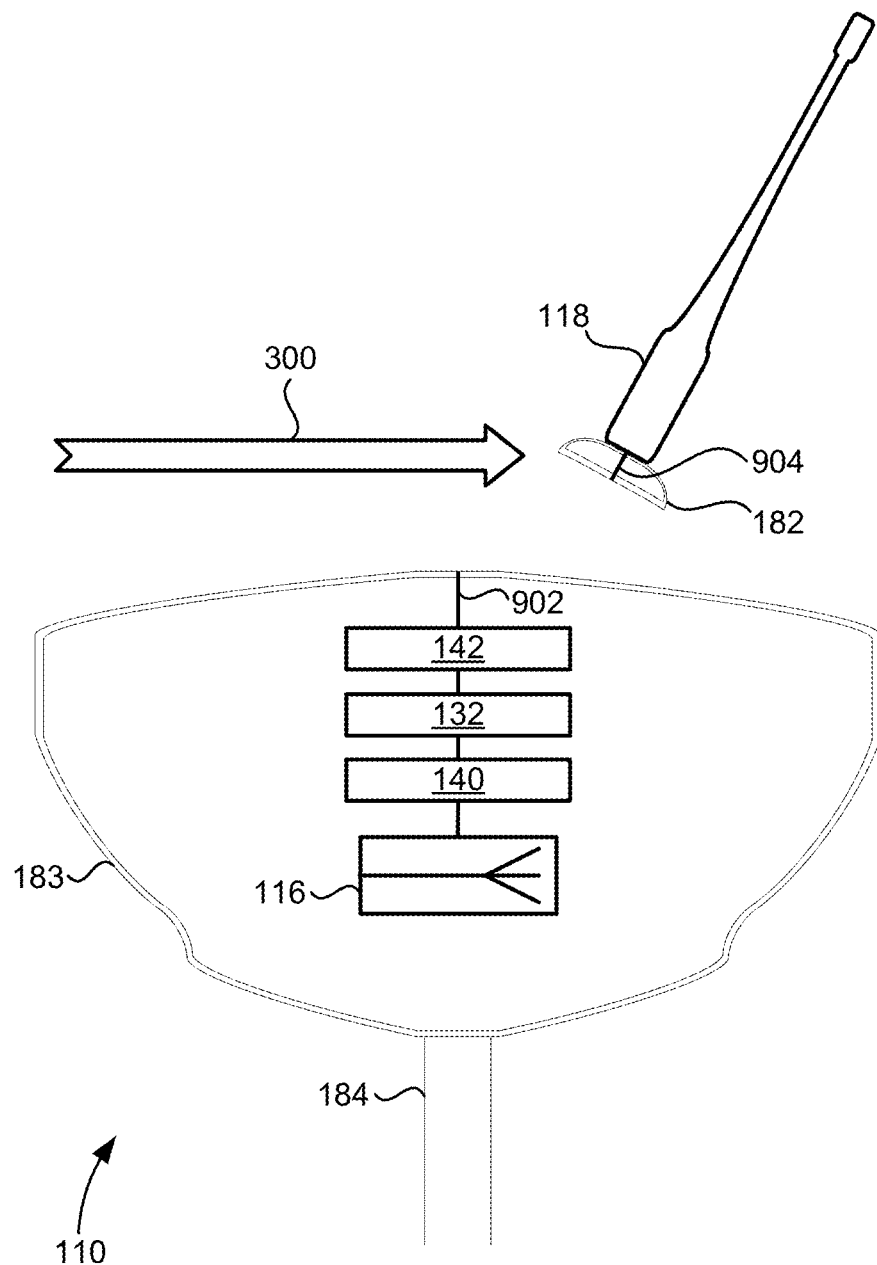

FIGS. 9A and 9B illustrate side schematic views of GNSS rover 110 with corrections antenna 118 removably attached (FIG. 9A) and detached (FIG. 9B), according to some embodiments of the present invention. In some embodiments, a first conductor 902 may be enclosed within radome 183 and a second conductor 904 may be enclosed within connection housing 182. Conductors 902 and 904 may be positioned such that they come into physical contact when connection housing 182 is removably attached to radome 183.

Figure 10:
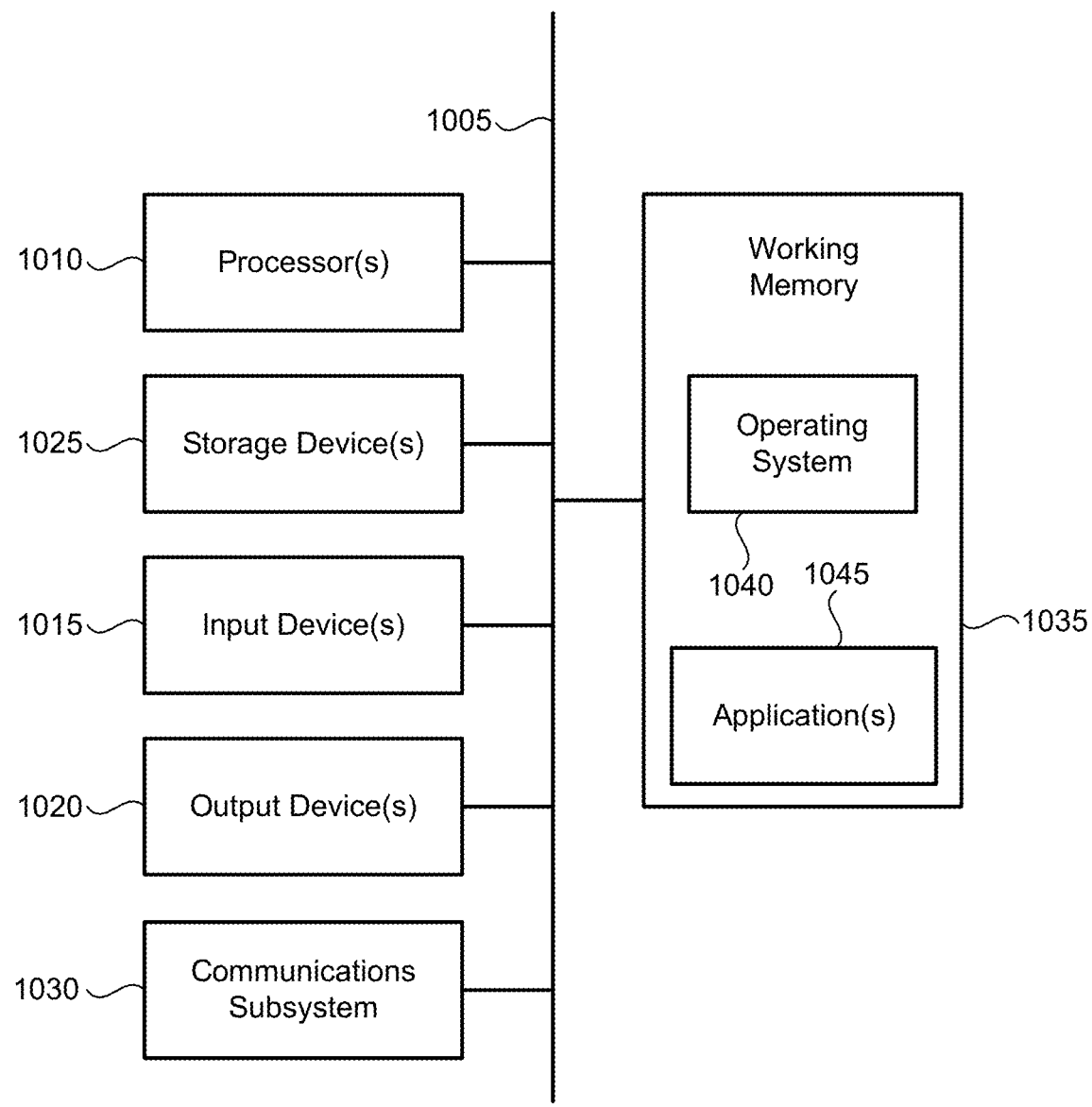
FIG. 10 illustrates a simplified computer system, according to some embodiments of the present disclosure.

FIG. 10 illustrates a simplified computer system 1000, according to some embodiments of the present disclosure. Computer system 1000 as illustrated in FIG. 10 may be incorporated into devices such as GNSS rover 110, receiver processor 132, base station 160, or some other device described herein. FIG. 10 provides a schematic illustration of one embodiment of computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or more integrated manner.

Computer system 1000 is shown comprising hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include, without limitation a mouse, a keyboard, a camera, and/or the like; and one or more output devices 1020, which can include, without limitation a display device, a printer, and/or the like.

Computer system 1000 may further include and/or be in communication with one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1000 might also include a communications subsystem 1030, which can include, without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1030 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1030. In other embodiments, a portable electronic device, e.g. the first electronic device, may be incorporated into computer system 1000, e.g., an electronic device as an input device 1015. In some embodiments, computer system 1000 will further comprise a working memory 1035, which can include a RAM or ROM device, as described above.

Computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1000 and/or might take the form of source and/or installable code, which, upon compilation and/or installation on computer system 1000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1000 to perform methods in accordance with various embodiments of the technology. According to a set of embodiments, some or all of the procedures of such methods are performed by computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A global navigation satellite system (GNSS) rover comprising:
    a radome;
    a GNSS antenna configured to receive GNSS signals from one or more GNSS satellites;
    a GNSS front end positioned within the radome and electrically coupled to the GNSS antenna, wherein the GNSS front end is configured to generate GNSS digital samples based on the received GNSS signals;
    a corrections antenna configured to receive corrections signals from a base station;
    a connection housing attached to the corrections antenna, wherein the connection housing is configured to removably attach to the radome;
    a corrections front end positioned enclosed within the radome and electrically coupled to the corrections antenna via a set of capacitor plates that form a capacitive coupling when the connection housing is removably attached to the radome and that do not form the capacitive coupling when the connection housing is detached from the radome, wherein the corrections front end is configured to generate corrections digital samples based on the received corrections signals, wherein the set of capacitor plates include:
        a first capacitor plate positioned within the radome and substantially parallel to an outer wall of the radome, wherein the first capacitor plate is electrically coupled to the corrections front end; and
        a second capacitor plate positioned within the connection housing and substantially parallel to an outer wall of the connection housing, wherein the second capacitor plate is electrically coupled to the corrections antenna; and
    one or more receiver processors positioned within the radome and configured to perform operations including:
        receiving the GNSS digital samples from the GNSS front end:
        receiving the corrections digital samples from the corrections front end; and
        generating GNSS position data based on the GNSS digital samples and the corrections digital samples.

2. The GNSS rover of claim 1, wherein the GNSS antenna is positioned within the radome.

3. The GNSS rover of claim 1, wherein the GNSS position data includes one or more position estimates of the GNSS rover.

4. The GNSS rover of claim 1, wherein generating the GNSS position data based on the GNSS digital samples and the corrections digital samples includes:
    generating a first position estimate using the GNSS digital samples; and
    correcting the first position estimate using the corrections digital samples to generate a second position estimate.

5. The GNSS rover of claim 1, wherein one or more first magnets are integrated into the radome and one or more second magnets are integrated into the connection housing such that the one or more first magnets produce an attractive force with the one or more second magnets when the connection housing is removably attached to the radome.

6. The GNSS rover of claim 5, wherein the one or more first magnets is a ring-shaped first magnet encircling the first capacitor plate and the one or more second magnets is a ring-shaped second magnet encircling the second capacitor plate.

7. The GNSS rover of claim 1, wherein each of the GNSS front end and the corrections front end comprises:
- a band-pass filter;
- a low-noise amplifier electrically coupled to the band-pass filter;
- a mixer electrically coupled to the low-noise amplifier;
- a local oscillator electrically coupled to the mixer; and
- an analog-to-digital converter electrically coupled to the mixer.

8. A method comprising:
- receiving, by a global navigation satellite system (GNSS) antenna, GNSS signals from one or more GNSS satellites;
- generating, by a GNSS front end positioned within a radome and electrically coupled to the GNSS antenna, GNSS digital samples based on the received GNSS signals;
- receiving, by a corrections antenna, corrections signals from a base station, wherein a connection housing is attached to the corrections antenna, and wherein the connection housing is configured to removably attach to the radome;
- generating, by a corrections front end positioned within the radome and electrically coupled to the corrections antenna via a set of capacitor plates that form a capacitive coupling when the connection housing is removably attached to the radome and that do not form the capacitive coupling when the connection housing is detached from the radome, corrections digital samples based on the received corrections signals, wherein the set of capacitor plates include: a first capacitor plate positioned within the radome and substantially parallel to an outer wall of the radome, the first capacitor plate being electrically coupled to the corrections front end, and a second capacitor plate positioned within the connection housing and substantially parallel to an outer wall of the connection housing, wherein the second;
- receiving, by one or more receiver processors positioned within the radome, the GNSS digital samples from the GNSS front end;
- receiving, by the one or more receiver processors, the corrections digital samples from the corrections front end; and
- generating, by the one or more receiver processors, GNSS position data based on the GNSS digital samples and the corrections digital samples.

9. The method of claim 8, wherein the GNSS antenna is positioned within the radome.

10. The method of claim 8, wherein the GNSS position data includes one or more position estimates of the GNSS rover.

11. The method of claim 8, wherein generating the GNSS position data based on the GNSS digital samples and the corrections digital samples includes:
- generating a first position estimate using the GNSS digital samples; and
- correcting the first position estimate using the corrections digital samples to generate a second position estimate.

12. The method of claim 8, wherein one or more first magnets are integrated into the radome and one or more second magnets are integrated into the connection housing such that the one or more first magnets produce an attractive force with the one or more second magnets when the connection housing is removably attached to the radome.

13. The method of claim 12, wherein the one or more first magnets is a ring-shaped first magnet encircling the first capacitor plate and the one or more second magnets is a ring-shaped second magnet encircling the second capacitor plate.

14. The method of claim 8, wherein each of the GNSS front end and the corrections front end comprises:
- a band-pass filter;
- a low-noise amplifier electrically coupled to the band-pass filter;
- a mixer electrically coupled to the low-noise amplifier;
- a local oscillator electrically coupled to the mixer; and
- an analog-to-digital converter electrically coupled to the mixer.

15. A non-transitory computer-readable medium comprising instructions that, when executed by one or more processors, cause the one or more processors to perform operations comprising:
- receiving, by a global navigation satellite system (GNSS) antenna, GNSS signals from one or more GNSS satellites;
- generating, by a GNSS front end positioned within a radome and electrically coupled to the GNSS antenna, GNSS digital samples based on the received GNSS signals;
- receiving, a corrections antenna, corrections signals from a base station, wherein a connection housing is attached to the corrections antenna, and wherein the connection housing is configured to removably attach to the radome;
- generating, by a corrections front end positioned within the radome and electrically coupled to the corrections antenna via a set of capacitor plates that form a capacitive coupling when the connection housing is removably attached to the radome and that do not form the capacitive coupling when the connection housing is detached from the radome, corrections digital samples based on the received corrections signals, Wherein the set of capacitor plates include: a first capacitor plate positioned within the radome and substantially parallel to an outer wall of the radome, the first capacitor plate being electrically coupled to the corrections front end, and a second capacitor plate positioned within the connection housing and substantially parallel to an outer wall of the connection housing, wherein the second capacitor plate is electrically coupled to the corrections antenna;
- receiving, by one or more receiver processors positioned within the radome, the GNSS digital samples from the GNSS front end;
- receiving, by the one or more receiver processors, the corrections digital samples from the corrections front end; and
- generating, by the one or more receiver processors, GNSS position data based on the GNSS digital samples and the corrections digital samples.

16. The non-transitory computer-readable medium of claim 15, wherein the GNSS antenna is positioned within the radome.

17. The non-transitory computer-readable medium of claim 15, wherein the GNSS position data includes one or more position estimates of the GNSS rover.

18. The non-transitory computer-readable medium of claim 15, wherein generating the GNSS position data based on the GNSS digital samples and the corrections digital samples includes:
- generating a first position estimate using the GNSS digital samples; and correcting the first position estimate using the corrections digital samples to generate a second position estimate.

19. The non-transitory computer-readable medium of claim 15, wherein one or more first magnets are integrated into the radome and one or more second magnets are integrated into the connection housing such that the one or more first magnets produce an attractive force with the one or more second magnets when the connection housing is removably attached to the radome.

20. The non-transitory computer-readable medium of claim 19, wherein the one or more first magnets is a ring-shaped first magnet encircling the first capacitor plate and the one or more second magnets is a ring-shaped second magnet encircling the second capacitor plate.

* * * * *